United States Patent [19]

Van Zyl

[11] Patent Number: 5,525,561

[45] Date of Patent: Jun. 11, 1996

[54] METHOD OF MAKING SPINEL COMPOUNDS

[75] Inventor: Arnold Van Zyl, Ulm, Germany

[73] Assignee: Programme 3 Patent Holdings, Luxembourg

[21] Appl. No.: 330,720

[22] Filed: Oct. 28, 1994

[30] Foreign Application Priority Data

Oct. 29, 1993 [ZA] South Africa ............... 93/8111

[51] Int. Cl.$^6$ ............................................. C09B 35/443
[52] U.S. Cl. ............... 501/120; 501/127; 501/153
[58] Field of Search ............................. 501/127, 153, 501/120

[56] References Cited

U.S. PATENT DOCUMENTS

| | | | |
|---|---|---|---|
| 3,457,033 | 7/1969 | Gatti et al. | 423/600 |
| 4,222,782 | 9/1980 | Allicgro et al. | 106/57 |
| 4,273,587 | 6/1981 | Oda et al. | 106/73.4 |
| 4,542,112 | 9/1985 | Matsui et al. | 501/120 |

FOREIGN PATENT DOCUMENTS

| | | |
|---|---|---|
| 530015 | 11/1976 | U.S.S.R. |
| 1095983 | 12/1967 | United Kingdom |
| 1235974 | 11/1971 | United Kingdom |
| 1296049 | 11/1972 | United Kingdom |

OTHER PUBLICATIONS

Dialog Abstract No. 84–228125/37,/JP 590135273A (Asahi Glass), Derwent Info Ltd. (1984) Aug. 3, 1984

Dialog Abstract No. 77–48346Y/27,/SU 0530015A (Vydrik), Derwent Info Ltd. (1986) Nov. 19, 1976.

*Primary Examiner*—Melissa Bonner
*Attorney, Agent, or Firm*—Arnold, White & Durkee

[57] ABSTRACT

The invention provides a method of making a magnesium/aluminium spinel compound having the formula $Mg_{(1+x)}Al_{(2-y)}O_4$ in which $0 \leq x \leq 0.2$ and $0 \leq y \leq 0.35$. Particulate aluminium metal and a magnesium-containing component selected from magnesium oxide and precursors thereof are mixed together and heated to 800°–1150° C. in an oxidising environment to cause oxidation of at least part of the aluminium. Further heating then takes place to a temperature of 1150°–1350° C. in the oxidizing environment to cause aluminium oxide and magnesium oxide in the admixture to react together.

27 Claims, No Drawings

METHOD OF MAKING SPINEL COMPOUNDS

THIS INVENTION relates to a method of making magnesium/aluminium spinel compounds. More particularly, it relates to a method of making such compounds, which method is suitable for the manufacture of polycrystalline artifact of magnesium/aluminium spinel compounds, the invention relates to such artifacts when made in accordance with this method, and the invention relates to green precursor admixtures of magnesium/aluminium spinel compounds.

The magnesium/aluminium spinel compounds in question have an ideal stoichiometric formula $MgAl_2O_4$, but form a family of compounds with a broad stoichiometric range. Over-stoichiometric magnesium oxide compounds of this family have a formula which can be expressed by $Mg_{(1+x)}Al_2O_4$ where $x \leq 0.2$ whereas over-stoichiometric aluminium oxide compounds of this family have a formula which can be expressed by $MgAl_{(2+y)}O_4$ where $y \leq 0.35$.

For subsequent description of the present invention, the term magnesium/aluminium spinel is meant to comprise all members of the family of compounds defined above.

The magnesium/aluminium spinel compounds in question are extremely refractory materials and are chemically resistant to attack by both acidic and basic substances over a broad temperature range. The refractory nature of said spinel compounds, combined with their chemical stability, makes them particularly suitable as a crucible material for extremely high temperature processing. A critical component of high temperature rechargeable electrochemical power storage cells such as sodium/sulphur cells or sodium/metal chloride cells is their sodium ion conducting $\beta''\text{-}Al_2O_3$ ceramic solid electrolyte. The final ceramic processing step of this electrolyte involves sintering at temperatures exceeding 1580° C. to produce a polycrystalline, dense ceramic artifact. During the sintering step, the ceramic artifact is encapsulated in an inert crucible or container to suppress loss of sodium oxide vapours therefrom. MgO-rich $MgAl_2O_4$ spinel is used as a cost effective encapsulation for the high temperature processing of the $\beta''\text{-}Al_2O_3$ ceramic electrolyte.

According to the invention there is provided a method of making a magnesium/aluminium spinel compound having the formula:

$$Mg_{(1+x)}Al_{(2+y)}O_4$$

in which:
$0 \leq x \leq 0.2$; and
$0 \leq y \leq 0.35$,
the method comprising the steps of:
mixing together, to form a green precursor admixture, particulate aluminium metal and a magnesium-containing component selected from magnesium oxide and precursors thereof;
heating the precursor admixture to 800°–1150° C. in an oxidising environment to cause oxidation of at least part of the aluminium; and
heating said admixture comprising the oxidised aluminium to a temperature of 1150°–1350° C. in said oxidizing environment to cause aluminium oxide and magnesium oxide in the admixture to react together to form the magnesium/aluminium spinel compound.

As described in more detail hereunder, a particular embodiment of the method contemplates use, in the precursor admixture, of one or more reagent compounds capable of providing oxidizing species for oxidizing the aluminium in the admixture when heated to 200°–700° C. in an oxidizing environment, the reagent compounds also being capable of reacting with aluminium oxide in response to heating to 800°–1150° C. in such environment to form the magnesium/aluminium spinel compound, so that, preferably, the proportions of the aluminium and of the reagent compounds in the precursor admixture are selected so that a major proportion of the aluminium is oxidized by the oxidizing species in response to the heating to 800°–1150° C. and so that, when said oxidation of the aluminium has taken place, the precursor admixture has a composition which provides a reaction mixture suitable for further heating to cause the constituents thereof to react together to form the magnesium/aluminium spinel compound., the reaction mixture then being heated to form said magnesium/aluminium spinel compound.

Thus, in general, the magnesium/aluminium spinel precursor admixture will comprise constituents (and optional sintering aid additives) which, when heated together to 800°–1150° C., provide aluminium oxide together with magnesium oxide.

The heating to obtain the magnesium/aluminium spinel compound, after the aluminium has been oxidized at 800°–1150° C., may be to a temperature of 1150°–1350° C., preferably about 1250° C., and the spinel compound may be converted into a unitary polycrystalline ceramic artifact, by further heating to a higher temperature of 1460°–1560° C., preferably 1490°–1510° C.

More particularly, the method may include using, as the magnesium containing component, a precursor of magnesium oxide, the heating of the admixture being from a starting temperature below 200° C., so that heating the admixture acts to convert the precursor of magnesium oxide to magnesium oxide at a temperature of 200°–700° C.

The heating may thus be to a maximum temperature of 1460°–1560° C. to produce a ceramic product; and the method may include compacting the precursor admixture prior to the heating to consolidate it into a unitary green artifact, so that the heating to 1460°–1560° C. sinters the artifact into a unitary polycrystalline ceramic artifact.

In principle, the heating steps can be carried out in a single heating cycle, starting with the green precursor admixture and heating from ambient up to the final temperature at which the ceramic is formed, with such alterations in heating rates and holds or soaks at desired temperatures, as may be desirable.

By a green precursor admixture (of a magnesium/aluminium spinel compound) is meant an admixture of constituents (aluminium and reagent compounds comprising magnesium compounds) which in intimate admixture upon heating will react to form the magnesium/aluminium spinel compound in question. In the course of, or prior to, the reaction to form the spinel compound, some of said constituents may undergo phase changes, such as melting, or chemical changes, such as thermal decomposition. The particulate aluminium metal is conveniently in the form of a powder.

The method may include, prior to the heating, mixing an oxidizing constituent into the precursor admixture, the oxidizing constituent being selected to provide oxidizing species in the green artifact by the time the artifact is heated to a temperature of 800° C., the oxidizing species contributing, in the interior of the artifact, to said oxidizing environment which causes oxidation of the aluminium. In particular, the oxidizing constituent may be selected from precursors of aluminium oxide, precursors of magnesium oxide and mixtures thereof which decompose upon heating to 200°–700°

C. to release said oxidizing species in the artifact, the heating being from a starting temperature which is below 200° C.

Oxidation of the aluminium may be aided by supplying an additional oxidant, not included in the green precursor admixture, so that the oxidant or the oxidants required to oxidise the aluminium need not be supplied entirely by the green precursor admixture, but may be supplied as external or additional oxidants, in the environment surrounding or adjacent the green precursor admixture.

Thus, the method may include heating the precursor mixture in an oxidizing atmosphere which contributes to the oxidizing environment.

Accordingly, additional or external oxidants may be supplied to the surroundings of the precursor admixture, e.g. to the atmosphere surrounding admixture, such as oxygen gas, water vapour, or other gases reducible by aluminium in the temperature range of 800°–1150° C., or they may be supplied from decomposable or volatile solids disposed around or in the vicinity of the precursor admixture.

Direct spinel formation from an aluminium oxide/magnesium oxide mixture can take place, e.g. according to the reaction:

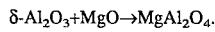
$\delta\text{-}Al_2O_3 + MgO \rightarrow MgAl_2O_4.$

According to the present invention, however, the $\delta\text{-}Al_2O_3$ and MgO are respectively replaced by aluminium and by precursors thereof, such as AlOOH and $Mg(OH)_2$, which can react together to form magnesium/aluminium spinel compounds according to the reaction:

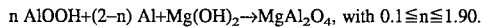
n AlOOH+(2–n) Al+Mg(OH)$_2$→MgAl$_2$O$_4$, with $0.1 \leq n \leq 1.90$.

In the case where $n \geq 1$, the entire oxygen requirement for the oxidation of metallic aluminium is provided by the dehydroxylation of $Mg(OH)_2$ and AlOOH in the temperature range 200° to 700° C. When n<1, additional oxygen preferably diffuses from the atmosphere surrounding the admixture to the metallic aluminium constituent of the precursor admixture to achieve the formation of $Al_2O_3$.

The invention may also comprise the step of forming a porous or partially porous spinel ceramic by including, in the admixture, volatile or decomposable oxidant-generating magnesium/aluminium spinel precursor components which are selected to leave pores in the ceramic by thermal volatilization or decomposition thereof, to provide oxidants and magnesium/aluminium spinel reagent compounds. This aspect does not exclude the manufacture of porous magnesium/aluminium spinel artifacts by use of conventional pore formers which, instead, are combustible organic compounds and as such require an additional oxygen feed to the reaction; or are compounds capable of decomposition/combustion prior to the heating to 200°–700° C.

The method may thus include mixing a pore former into the admixture, the pore former being selected from volatile or decomposable materials which leave pores in the ceramic artifact when it has been sintered; and, in particular, the pore former may be an oxidizing constituent selected to provide oxidizing species in the artifact by the time it is heated to a temperature of 800° C.

To achieve effective use of starting materials, the method may include selecting the proportions of the constituents of the admixture so that there is an atomic ratio of Mg:Al in the admixture of 1:2.35–1.2:2.

Homogeneity and reproducibility of green and sintered bodies are desirable and require a homogeneous and reproducible precursor and admixture, which may be provided for by sufficient milling and, optionally, granulation of the mixture. Thermal treatment required during preparation of the admixture and/or granules may thus be confined to drying of a slurry admixture, if wet milling is chosen for the mixing.

The reagent compounds capable of providing oxidizing species upon heating may be selected from hydroxides, oxyhydroxides, peroxides, nitrates, sulphates, chlorates and mixtures thereof, optionally in conjunction with halides and oxyhalides, in particular chlorides and/or fluorides.

By in conjunction with is meant that halides and oxyhalides can act to facilitate aluminium oxidation by furnace atmospheres or by oxidants in general.

The particulate aluminium may be selected to be a powder having a grain or particle size of 0.5–100 μm, preferably 5–50 μm.

It is expected that, although the method of the present invention can be used to make magnesium/aluminium spinel compounds in the form of powders, its principal application will be in the manufacture of magnesium/aluminium spinel artifact, such as polycrystalline sintered bodies.

When such artifact or sintered bodies are to be made in accordance with the method of the present invention, the method will typically, as indicated above, include a compressing or consolidating step whereby the green precursor admixture is compressed and consolidated into a green artifact or body, prior to the heating to 200°–700° C. to produce the oxidizing species. The artifact or body will then be heated to produce said species, to cause said species to react with the aluminium to produce aluminium oxides, to cause the reaction to form the magnesium/aluminium spinel compound, and to cause the conversion to a unitary sintered polycrystalline ceramic artifact or body. The consolidation or compressing may be by uniaxial or isostatic pressing, and may be to a pressure of 25–800 MPa, e.g. 350 MPa.

The invention also extends to a green precursor admixture of a magnesium/aluminium spinel compound, the admixture comprising particulate aluminium metal and a magnesium-containing component selected from magnesium oxide and precursors thereof.

Preferably the aluminium metal is intimately admixed with reagent compounds, which reagent compounds are capable, upon heating to 200°–700° C., of providing oxidizing species for oxidizing the aluminium and which are capable of reacting with aluminium oxide in response to heating to form the desired magnesium/aluminium spinel compound, the proportions of the aluminium and of the reagent compounds in the precursor admixture being selected so that a major proportion (at least 50%) of the aluminium is oxidizable by said species in response to heating the admixture to 800°–1150° C., and so that the admixture, upon heating to 800°–1150° C., yields the oxide composition required to form the desired magnesium/aluminium spinel compound.

More particularly, the green precursor admixture may be as described above with reference to the method, and, in particular, it may be in the form of a consolidated green body or artifact, having a desired shape, which can be formed into a unitary polycrystalline sintered product by suitable heating.

The invention also extends to a magnesium/aluminium spinel compound, whenever produced by the method described above.

The invention will now be described in more detail, with reference to the following non-limiting examples:

EXAMPLE 1

Magnesium Rich Spinel.

The MgAl$_2$O$_4$ spinel ceramic described in this example has a typical composition Mg$_{1.2}$Al$_2$O$_4$ and exactly 50 mole % of the required aluminium content is provided by metallic aluminium.

A stoichiometric reaction mixture containing the following components is dry mixed for 30 minutes in a Turbula mixer

| Boehmite (AlOOH) | 60 g |
|---|---|
| Al metal powder (9 μm) | 27 g |
| Mg(OH)$_2$ | 69.6 g |

150 ml of isopropanol solvent (or n-pentanol) is added to the dry reaction mixture and the resulting slurry is then milled in an attritor mill with zirconia grinding media for approximately one hour until the average particle size of the slurry is below 10 μm.

The resulting slurry is dried in a rotary vacuum dryer at 40° C. to produce a granulate consisting of finely intermeshed metal and non-metal powder. The solvent can be recovered and reused in the milling step.

The powder is uniaxially pressed (200 MPa) to a high density green body. During the uniaxial pressing, the voids between the rigid inorganic powder reactants are filled by plastic flow of the aluminium particles resulting in a strong green body consisting of an intermeshed metal/metal hydroxide composite.

This composite green body is sintered with the following sintering programme: 600 K/h from room temperature to 1500° C., hold at this temperature for 30 minutes and cool to room temperature at the furnace cooling rate. The resulting ceramic artifact is found to be a single-phase spinel ceramic with a density exceeding 3.55 g/cm$^3$.

EXAMPLE 2

Aluminium Rich Spinel.

The MgAl$_2$O$_4$ spinel ceramic described in this example has a typical composition Mg Al$_{2.3}$O$_4$ and exactly 50 mole % of the required aluminium content is provided by metallic aluminium.

A reaction mixture containing the following components is dry mixed for 30 minutes in a Turbula mixer:

| Boehmite (AlOOH) | 69 g |
|---|---|
| Al metal powder (9 μm) | 31.05 g |
| Mg(OH)$_2$ | 69.6 g |

150 ml of isopropanol solvent (or n-pentanol) is added to the dry reaction mixture and the resulting slurry is then milled in an attritor mill with zirconia grinding media for approximately one hour until the average particle size of the slurry is below 10 μm.

The resulting slurry is dried in a rotary vacuum dryer at 40° C. to produce a granulate consisting of finely intermeshed metal and nonmetal powder. The solvent can be recovered and reused in the milling step.

The powder is uniaxially pressed (200 MPa) to a high density green body. During the uniaxial pressing, the voids between the rigid inorganic powder reactants are filled by plastic flow of the aluminium particles resulting in a strong green body consisting of an intermeshed metal/metal hydroxide composite.

This composite green body is sintered with the following sintering programme: 600 K/h from room temperature to 1500° C., hold at this temperature for 30 minutes and cool to room temperature at the furnace cooling rate. The resulting ceramic artifact is found to be a single phase spinel ceramic with a density exceeding 3.55 g/cm$^3$.

The Applicant has in the past prepared MgAl$_2$O$_4$ spinel ceramics by reacting magnesium and aluminium oxides, or their precursors, together at elevated temperatures. The reaction product was then wet milled, dried, pressed to a green body, and sintered to produce a polycrystalline ceramic artifact. These procedures included strategies to increase the reaction kinetics and reduce the reaction and sintering temperatures, e.g. substitution of α-Al$_2$O$_3$ by more reactive precursors such as boehmite or γ-Al$_2$O$_3$ and the use of small amounts of dopant materials such as boron or fluorides. Such methods required multiple process steps and led to relatively high shrinkage. An alternative strategy aimed at increasing the homogeneity and decreasing the primary particle size by the use of soluble precursors of aluminium and magnesium. These solutions, containing amongst others Mg$^{2+}$ and Al$^{3+}$ ions, were then converted to oxyhydroxide mixtures by pH changes, chemical hydrolysis or pyrolysis. Although such chemical routes led to high purity powder products, the voluminous powder products were not easily processed to dense ceramic materials.

General features of the above prior processing routes were the use of expensive chemical precursors, intensive high temperature reaction schedules, low density, fragile intermediate green bodies and relatively high shrinkage and associated deformation during sintering.

The present invention, in contrast, provides a method for producing high density, high strength single phase magnesium/aluminium spinel ceramic artifact, which, at least as described with reference to the above Examples, are homogeneous on a microstructural scale.

The invention, as described in the Examples at least, provides magnesium/aluminium spinel precursors as firm, machinable green bodies which can be sintered to dense ceramic artifact with controllable shrinkage and minimum deformation, in a single firing step.

The invention provides, moreover, the capability, in principle, of rapid firing of the said green bodies, and therewith increased sintering furnace throughput.

By including aluminium metal in the precursor mix according to the present invention, and oxidizing said aluminium internally, i.e. by using a decomposition product of another component of the precursor mix to take said aluminium into spinel compound formation, the overall volume change and deformation can be reduced, and a single-step synthesis from the green body is made possible, yielding magnesium/aluminium spinels of the desired composition within the desired range of homogeneity of the compounds in question.

Particularly valuable mechanical properties can in principle be conferred on the green body by the aluminium metal content of the precursor admixture. Plastic flow of the metal particles can allow uniaxial pressing to achieve high density and strength of an intermeshed oxyhydroxide/metal composite. This composite not only promotes high green strength but can promote an intimate, continuous reaction surface for the initial internal oxidation as well as for the subsequent reaction to the final spinel phase.

I claim:

1. A method of making a magnesium/aluminum spinel compound having the formula:

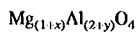

Mg$_{(1+x)}$Al$_{(2+y)}$O$_4$ in which:

0≦x0.2; and

0≦x0.35, the method comprising the steps of:

mixing together, to form a green precursor admixture, perticulate aluminum metal and a magnesium-containing component which is a precursor of magnesium oxide which converts to magnesium oxide in the temperature range of 200°–700° C.;

heating the precursor admixture to 800°–1150° C. in an oxidising environment to cause oxidation of at least pan of the aluminum; and heating said admixture comprising the oxidised aluminum to a temperature of 1150°–1350° C. in said oxidizing environment to cause aluminum oxide and magnesium oxide in the admixture to react together to form the magnesium/aluminum spinel compound, the heating step being started at a temperature below 200° C.

2. A method as claimed in claim 1, in which the spinel compound is further heated to 1460°–1560° C. to produce a ceramic product.

3. A method as claimed in claim 2, which includes compacting the precursor admixture prior to the heating to consolidate it into a unitary green artifact, the heating to 1460°–1560° C. acting to sinter the artifact.

4. A method as claimed in claim 3, in which an oxidizing constituent is mixed into said admixture before the heating, the oxidizing constituent decomposing at a temperature below 800° C.

5. A method as claimed in claim 4, in which the oxidizing constituent is selected from precursors of aluminum oxide, precursors of magnesium oxide and mixtures thereof, the oxidizing constituent decomposing in the temperature range of 200°–700° C.

6. A method as claimed in claim 3, which includes heating the precursor admixture in an oxidizing atmosphere.

7. A method as claimed in claim 3, which includes mixing a pore former into the admixture, the pore former being selected from volatile materials and decomposable materials.

8. A method as claimed in claim 7, in which the pore former is an oxidizing constituent which decomposes at a temperature below 800° C.

9. A method as claimed in claim 1 which includes selecting the proportions of the constituents of the admixture so that there is an atomic ratio of Mg:Al in the admixture of 1:2.35-1.2:2.

10. A method as claimed in claim 1, in which the green precursor admixture comprising metal-containing components selected from aluminum metal, precursors of aluminum oxide, magnesium oxide, and precursors of magnesium oxide.

11. A method as claimed in claim 1, in which the aluminum metal forms at least 5 % of the total aluminum present in the precursor admixture.

12. A method of making a magnesium/aluminum spinel compound having the formula:

$$Mg_{(1+x)}Al_{(2+y)}O_4$$

in which:
$0 \leq y \leq 0.2$; and
$0 \leq y \leq 0.35$,
the method comprising the steps of:

mixing together, to form a green precursor admixture, particulate aluminum metal, a magnesium-containing component which is magnesium oxide and an oxidizing constituent which decomposes in the temperature range of 200°–700° C., the oxidizing constituent being selected from precursors of aluminum oxide, precursors of magnesium oxide and mixtures thereof;

heating the precursor admixture to 800°–1150° C. in an oxidizing environment to cause oxidation of at least part of the aluminum; and heating said admixture comprising the oxidized aluminum to a temperature of 1150°–1350° C. in said oxidizing environment to cause aluminum oxide and magnesium oxide in the admixture to react together to form the magnesium/aluminum spinel compound, the heating step being staffed at a temperature below 200° C., the spinel compound being further heated to 1460°–1560° C. to produce a ceramic product, and the method including compacting the precursor admixture prior to the heating to consolidate it into a unitary green artifact, the heating to 1460°–1560° C. acting to sinter the artifact.

13. A method as claimed in claim 12, which includes heating the precursor admixture in an oxidizing atmosphere.

14. A method as claimed in claim 12, which includes mixing a pore former into the admixture, the pore former being selected from volatile materials and decomposable materials.

15. A method as claimed in claim 14, in which the pore former is an oxidizing constituent which decomposes at a temperature below 800° C.

16. A method as claimed in claim 12, which includes selecting the proportions of the constituents of the admixture so that there is an atomic ratio of Mg:Al in the admixture of 1:2.35-1.2:2.

17. A method as claimed in claim 16, in which the green precursor admixture comprising metal-containing components selected for aluminum metal, precursors of aluminum oxide, magnesium oxide and precursors of magnesium oxide.

18. A method as claimed in claim 12, in which the aluminum metal forms at least 5% of the total aluminum present in the precursor admixture.

19. A method of making a magnesium/aluminum spinel compound having the formula:

$$Mg_{(1+x)}Al_{(2+y)}O_4$$

in which:
$0 \leq x \leq 0.2$, and
$0 \leq y \leq 0.35$,
the method comprising the steps of:

mixing together, to form a green precursor admixture, particulate aluminum metal and a magnesium-containing component selected from magnesium oxide and precursors thereof, and a pore former selected from volatile materials and decomposable materials;

heating the precursor admixture to 800°–1150° C. in an oxidizing environment to cause oxidation of at least part of the aluminum; and heating said admixture comprising the oxidized aluminum to a temperature of 1150°–1350° C. in said oxidizing environment to cause aluminum oxide and magnesium oxide in the admixture to react together to form the magnesium/aluminum spinel compound, the spinel compound being further heated to 1460°–1560° C. to produce a ceramic product, the method including compacting the precursor admixture prior to the heating to consolidate it into a unitary green artifact, and the heating to 1460°–1560° C. acting to sinter the artifact.

20. A method as claimed in claim 19, in which the magnesium-containing component is a precursor of magnesium oxide which converts to magnesium oxide in the temperature range of 200°–700° C., the heating step being started at a temperature below 200° C.

21. A method as claimed in claim 19, in which an oxidizing constituent is mixed into said admixture before the heating, the oxidizing constituent decomposing at a temperature below 800° C.

22. A method as claimed in claim 21, in which the oxidizing constituent is selected from precursors of aluminum oxide, precursors of magnesium oxide and mixtures thereof, the oxidizing constituent decomposing in the temperature range of 200°–700° C.

23. A method as claimed in claim 19, which includes heating the precursor admixture in an oxidizing atmosphere.

24. A method as claimed in claim 19, in which the pore former is an oxidizing constituent which decomposes at a temperature below 800° C.

25. A method as claimed in claim 19, which includes selecting the proportions of the constituents of the admixture so that there is an atomic ratio of Mg:Al in the admixture of 1:2.35–1.2:2.

26. A method as claimed in claim 19, in which the green precursor admixture comprising metal-containing components selected from aluminum metal, precursors of aluminum oxide, magnesium oxide and precursors of magnesium oxide.

27. A method as claimed in claim 19, in which the aluminum metal forms at least 5% of the total aluminum present in the precursor admixture.

\* \* \* \* \*

UNITED STATES PATENT AND TRADEMARK OFFICE
CERTIFICATE OF CORRECTION

PATENT NO. : 5,525,561

DATED : June 11, 1996

INVENTOR(S) : Arnold Van Zyl

It is certified that error appears in the above-identified patent and that said Letters Patent is hereby corrected as shown below:

In claim 1, column 6, line 66, delete "$0 \leq x 0.2$" and insert --$0 \leq x \leq 0.2$-- therefor.

In claim 1, column 6, line 67, delete "$0 \leq x 0.35$" and insert --$0 \leq y \leq 0.35$-- therefor.

In claim 1, column 7, line 2, delete "perticulate" and insert --particulate-- therefor.

In claim 1, column 7, line 7, delete "pan" and insert --part-- therefor.

In claim 12, column 7, line 58, delete "$0 \leq y \leq 0.2$" and insert --$0 \leq x \leq 0.2$-- therefor.

In claim 12, column 8, line 9, delete "staffed" and insert --started--.

In claim 17, column 8, line 30, delete "for" and insert --from-- therefor.

In claim 19, column 8, line 41, delete "," and insert --;-- therefor.

Signed and Sealed this

Twenty-seventh Day of August, 1996

Attest:

BRUCE LEHMAN

*Attesting Officer*   *Commissioner of Patents and Trademarks*